(12) United States Patent
Itoh

(10) Patent No.: US 7,218,314 B2
(45) Date of Patent: May 15, 2007

(54) COORDINATE INPUT DEVICE

(75) Inventor: Akihisa Itoh, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 182 days.

(21) Appl. No.: 10/162,241

(22) Filed: Jun. 4, 2002

(65) Prior Publication Data
US 2002/0186210 A1    Dec. 12, 2002

(30) Foreign Application Priority Data
Jun. 7, 2001  (JP) .............................. 2001-172455

(51) Int. Cl.
G09G 5/00    (2006.01)
G06F 3/033   (2006.01)

(52) U.S. Cl. .................................. 345/173; 178/19.07

(58) Field of Classification Search ........ 345/173–183, 345/157, 158, 156; 178/18.01, 18.02, 18.06, 178/19.07
See application file for complete search history.

(56) References Cited

U.S. PATENT DOCUMENTS

| | | | |
|---|---|---|---|
| 4,723,056 A * | 2/1988 | Tamaru et al. ........... 178/18.02 |
| 5,506,375 A * | 4/1996 | Kikuchi .................... 178/18.07 |
| 5,534,892 A * | 7/1996 | Tagawa ....................... 345/173 |
| 5,565,658 A * | 10/1996 | Gerpheide et al. ........ 178/18.02 |
| 5,670,755 A * | 9/1997 | Kwon ....................... 178/18.05 |
| 5,790,106 A * | 8/1998 | Hirano et al. ............... 345/173 |
| 5,896,127 A | 4/1999 | Matsufusa et al. |
| 5,905,489 A * | 5/1999 | Takahama et al. .......... 345/174 |
| 5,940,064 A * | 8/1999 | Kai et al. .................... 345/173 |
| 6,002,389 A * | 12/1999 | Kasser ....................... 345/173 |
| 6,124,848 A * | 9/2000 | Ballare et al. .............. 345/179 |
| 6,211,858 B1 * | 4/2001 | Moon et al. ................. 345/771 |
| 6,400,359 B1 * | 6/2002 | Katabami ................... 345/173 |
| 6,424,339 B1 * | 7/2002 | Randall ...................... 345/173 |
| 6,628,268 B1 * | 9/2003 | Harada et al. ............... 345/173 |
| 2002/0020836 A1 * | 2/2002 | Kikuchi et al. ................. 257/1 |

* cited by examiner

Primary Examiner—Richard Hjerpe
Assistant Examiner—Kevin M. Nguyen
(74) Attorney, Agent, or Firm—Brinks Hofer Gilson & Lione

(57) ABSTRACT

A coordinate input device includes a coordinate input element. The coordinate input element includes a transparent coordinate detector and a controller having a control circuit which drives and controls the coordinate detector and which corrects electrostatic capacitance noise disturbing the coordinate detector. The coordinate input device also includes a liquid crystal display device provided on the back side of the coordinate input element, a casing for holding the coordinate input element and the liquid crystal display device, and an L-shaped and a reverse L-shaped push button switches provided on the upper surface of the casing.

27 Claims, 5 Drawing Sheets

COORDINATE INPUT DEVICE

This application claims the benefit of priority to Japanese Patent Application 2001-172455, filed on Jun. 7, 2001.

BACKGROUND OF THE INVENTION

1. Field of the Invention

The present invention relates to electrostatic-capacitance-type coordinate input devices, which are operated with a user's finger and so on, and in which the coordinate position of a touched portion is detected based on a current variation according to a variation in electrostatic capacitance and the coordinate position of the touched portion is input.

2. Description of the Related Art

In recent years, notebook computers have been widely used for space-saving in offices and homes. In this type of computer, a pad-type coordinate input device operated by dragging a finger on a touch board has been widely adopted and put into practical use as a coordinate input device for moving a cursor displayed on a display.

FIG. 7 is a perspective view showing the configuration of a critical portion of a coordinate input device 100.

The coordinate input device 100 shown in FIG. 7 includes a planar touch board 101 provided at the top, a film substrate 106 comprising a dielectric thin film such as a resin film provided on the lower surface of the touch board 101, and a circuit board 107 provided on the lower surface of the film substrate 106. The film substrate 106 is a dielectric substrate. The upper surface of the film substrate 106 is provided with a plurality of X-electrodes 106a at predetermined intervals and the rear surface thereof is provided with a plurality of Y-electrodes 106 at predetermined intervals. The planar touch board 101 is bonded to the upper surface of the film substrate 106 with an adhesive or the like. Also, the film substrate 106 and the circuit board 107 are bonded via a dielectric film (not shown).

In the above-described film substrate 106, the Y-electrodes 106b extend in the direction orthogonal to the X-electrodes 106a and the electrodes 106a and 106b are arranged in a matrix in plan view, with the film substrate 106 therebetween. Also, the X-electrodes 106a and the Y-electrodes 106b are printed on the upper surface and the lower surface of the film substrate 106 respectively, with a silver paste or the like. Further, through-holes 108 are formed along one edge of the circuit board 107 and along another edge adjacent to that edge. Also, land portions electrically connected to the electrodes 106a and 106b are formed on the rear surface of the film substrate 106 at positions corresponding to first ends of the X-electrodes 106a and first ends of the Y-electrodes 106b. The land portions and the through-holes 108 of the circuit board 107 are electrically connected. That is, the X-electrodes 106a and the Y-electrodes 106b are electrically connected to a wiring pattern formed on the upper surface of the circuit board 107 via the through-holes 108.

Further, a ground layer 109 comprising a copper foil or the like is provided at the center of the upper surface of the circuit board 107. The ground layer 109 helps to prevent a signal generated in the lower part of the circuit board 107 from disturbing the X-electrodes 106a and the Y-electrodes 106b. Also, a control circuit chip 110 is soldered to the wiring pattern on the rear surface of the circuit board 107. By scanning the touch board 101 with a finger so that the finger is in soft contact with the touch board 101, a part of the electric flux lines formed between the X-electrodes 106a and the Y-electrodes 106b of the film substrate 106 is absorbed by the finger, and thus the electric flux lines to the Y-electrodes 106b are reduced so that electrostatic capacitance varies. The control circuit chip 110 converts the variation in the electrostatic capacitance to a variation in an electrical signal and the variation in the electrical signal is converted to a desired coordinate position, whereby the position of the finger on the touch board 101 can be detected.

The coordinate input device 100 having the above described configuration is often mounted in front of a keyboard in a notebook personal computer and can be operated without the user moving his/her hands much away from the home position of the keyboard. However, in many pad-type coordinate input devices, a flat touch board is exposed at the surface of the computer. Thus, a person who is not accustomed to operate a computer is often puzzled by the operation method and this type of coordinate input device does not have excellent ease of use.

Also, when the area of the touch board 101 is greatly reduced, the operability and ease of use of the above-described coordinate input device are reduced. Thus, it is inevitable that the touch board 101 occupies a predetermined space in the operating portion of a notebook personal computer. Therefore, it is difficult to further miniaturize the touch board in a notebook personal computer including the coordinate input device 100. Accordingly, the inventors of the present invention have considered adding another function to the portion occupied by the coordinate input device 100 and have investigated improving the ease of use of the coordinate input device and electronic equipment including the same, and as a result, the present invention has been completed.

SUMMARY OF THE INVENTION

Accordingly, it is an object of the present invention to provide an inexpensive coordinate input device which has transparency and a high light transmittance and which operates stably so that another function can be easily added to the coordinate input device.

In order to achieve the above-described object, the present invention adopts the following configuration.

The coordinate input device according to the present invention comprises: a coordinate detector including a first insulating layer which has transparency and which is formed at the top; a first electrode layer having a plurality of linear transparent electrodes formed in parallel on the lower surface of the first insulating layer; a second insulating layer which has transparency and which is formed on the lower surface of the first electrode layer; a second electrode layer having a plurality of linear transparent electrodes which are aligned in parallel and which extend in the direction orthogonal to the transparent electrodes of the first electrode layer, the second electrode layer being formed on the lower surface of the second insulating layer; and a third insulating layer which has transparency and which is formed on the lower surface of the second electrode layer, and a controller which is electrically connected to the two electrode layers of the coordinate detector so as to drive and control the electrode layers and which has a circuit for correcting electrostatic capacitance noise that disturbs the coordinate detector.

In the coordinate input device according to the present invention, the coordinate detector is configured by sandwiching the second insulating layer with the two electrode layers and providing the first insulating layer and the third insulating layer on each of the electrode layers respectively. Also, by forming each of the layers by using a transparent material, the transparent coordinate input device is realized. In the configuration of the coordinate input device in the known art shown in FIG. 7, each layer is laminated in the following order: the ground layer 109, the insulating layer, the Y-electrodes 106b, the insulating layer, the X-electrodes 106a, and the touch board 101, from the side of the circuit board 107. On the other hand, the coordinate detector of the coordinate input device according to the present invention does not have a layer corresponding to the ground layer 109 shown in FIG. 7. The light transmittance of the coordinate detector is high because the coordinate detector does not include the ground layer. In the coordinate input device 100 shown in FIG. 7, the ground layer 109 is provided so that a noise, which is caused when the control circuit chip is driven, does not disturb the electrostatic capacitance generated between the electrodes 106a and 106b. Thus, when the ground layer 109 is not provided, a method for preventing the disturbance of the noise is necessary. The coordinate input device of the present invention operates stably without the ground layer, because the control circuit includes a correction unit for removing noise. Accordingly, the coordinate input device of the present invention has a transparent coordinate detector whose light transmittance is high, and can operate stably.

That is, in the coordinate input device of the present invention, at least the coordinate detector is transparent. Thus, the object placed on the back side of the coordinate detector can be seen from the side of the coordinate detector surface. Also, another function can be added to the portion occupied by the coordinate input device and the space can be effectively used. For example, by displaying the method for operating the coordinate input device so that the method is transmitted through the coordinate detector, the coordinate input device can be easily operated by even a person who is not accustomed to operate the coordinate input device. Accordingly, the usability of the device can be significantly improved.

Also, the coordinate input device of the present invention comprises: a coordinate detector including a first insulating layer which has transparency and which is formed at the top; a first electrode layer having a plurality of linear transparent electrodes formed in parallel on the lower surface of the first insulating layer; a second insulating layer which has transparency and which is formed on the lower surface of the first electrode layer; a second electrode layer having a plurality of linear transparent electrodes which are aligned in parallel and which extend in the direction orthogonal to the transparent electrodes of the first electrode layer, the second electrode layer being formed on the lower surface of the second insulating layer; and a third insulating layer which has transparency and which is formed on the lower surface of the second electrode layer, and a display device placed on the back side of the coordinate detector. A scanning frequency for scanning the electrodes of the coordinate input device is different from a driving frequency of the display device.

That is, in the coordinate input device of the present invention, since the display device is placed on the back side of the transparent coordinate detector, information displayed on the display device is transmitted through the coordinate detector so that an operator can see the information. With this configuration, by displaying necessary information such as hints for operation on the display device as required, a person who is not accustomed to operate the device can easily operate the coordinate input device or electronic equipment including the same. Alternatively, the display device can display an image, a calendar, time, and so on.

In the coordinate input device of the present invention, a scanning frequency for scanning the electrodes of the coordinate detector in a predetermined direction is different from a driving frequency for driving the display device. With this arrangement, the coordinate detector and the display device do not mutually disturb. Accordingly, deterioration in the detecting accuracy and malfunction of the coordinate input device and distortion of the display of the display device can be effectively prevented, and thus a stable operation can be realized.

Preferably, the coordinate input device further comprises a controller which is electrically connected to the two electrode layers of the coordinate detector so as to drive and control the electrode layers and which has a correction unit for removing electrostatic capacitance noise that disturbs the coordinate detector. With this configuration, disturbance from the display device provided on the back side of the coordinate detector and electronic equipment including the coordinate input device can be canceled. Accordingly, a malfunction of the coordinate input device can be prevented.

The display device may be a liquid crystal display device or an EL display device in which electroluminescent elements are aligned.

The advantage of the coordinate input device of the present invention can be achieved by using either of the above-mentioned display devices. Also, a thin and low-power-consumption coordinate input device can be realized by using either of the display devices.

For a liquid crystal display device as the display device according to the present invention, any type can be adopted without problems. Specifically, any of a transmissive-type, a reflective-type, and a transflective-type can be used. Furthermore, the driving method may be any of a passive matrix and an active matrix.

In addition, an arbitrary type of EL display device, such as a display device in which a gray scale is displayed by a variation in the luminance of EL elements or a display device using light of EL elements as lighting and including a liquid crystal device as an optical modulation element, can be used. Also, the EL element may be selected from an inorganic EL element, a polymer organic EL element, and a low-molecular organic EL element.

Also, a ground layer comprising a conductor may be provided on the back side of the display device. With this configuration, the coordinate detector and the display device can be electrically operated stably and an electrical disturbance from electronic equipment including the coordinate input device can be prevented. The ground layer comprising a copper foil or the like is provided at the center of the upper surface of a circuit board. The ground layer helps to prevent a signal generated in the lower part of the circuit board from disturbing X-electrodes and Y-electrodes.

Preferably, the controller comprises a reference signal storing unit for storing a reference signal, which is a detection signal obtained by scanning the electrodes of the first electrode layer and the second electrode layer while no operation is performed; and a correction value calculating unit for subtracting the reference signal from a detection signal while an operation is performed, thereby correcting the detection signal during the operation.

In the coordinate input device of the present invention, the electrodes are scanned when an indicating device such as a finger or a pen is not in contact with or is not approaching the coordinate detector (while no operation is performed), and an obtained detection signal is stored as a reference signal. Then, by subtracting the reference signal from a detection signal obtained by scanning the electrodes while the indicating device is put on the coordinate detector (during operation), variation in electrostatic capacitance generated by the indicating device is calculated so as to detect the coordinate position of the indicating device. Accordingly, variation in the electrostatic capacitance between the electrodes and the disturbance of noise from the control circuit can be removed from the detection result, and thus the coordinate input device which has a high detection accuracy and which operates stably can be achieved.

Each of the first insulating layer, the second insulating layer, and the third insulating layer may comprise a flexible resin substrate.

With this arrangement, the coordinate detector is flexible and thus the coordinate detector can be placed at a curved surface. Accordingly, the freedom of arrangement of the coordinate input device can be enhanced.

The light transmittance of the coordinate detector is preferably 90% or more.

With this arrangement, information displayed on the back side of the coordinate detector can be clearly seen. For example, by displaying the method for using the coordinate input device on the back side of the coordinate detector, a user can easily know the method, and thus the usability of the coordinate input device can be improved.

The coordinate detector and the controller of the coordinate input device may be connected to each other by a flexible wiring board, and the flexible wiring board may be placed on a side of the display device so that the controller is placed on the back side of the display device.

With this arrangement, the controller does not protrude outward from the coordinate detector in the coordinate input device, and thus the space for the coordinate input device can be reduced and the space in electronic equipment including the coordinate input device can be effectively used. Since the coordinate detector is transparent, it is not preferable to place the controller on the back side of the coordinate detector. However, by providing the display device on the back side of the coordinate detector and providing the controller on the back side of the display device, the controller can not be seen from the coordinate detector side.

The coordinate detector and the display device may be held on a casing and one or a plurality of push button switches may be provided on the upper surface of the casing. With this arrangement, operation buttons can be integrated into the coordinate input device. Accordingly, the coordinate input device can be easily integrated into electronic equipment and separate operation buttons are not required. Therefore, the manufacturing cost can be reduced.

DESCRIPTION OF THE PREFERRED EMBODIMENTS

Hereinafter, embodiments of the present invention will be described with reference to the drawings.

Figure 1:
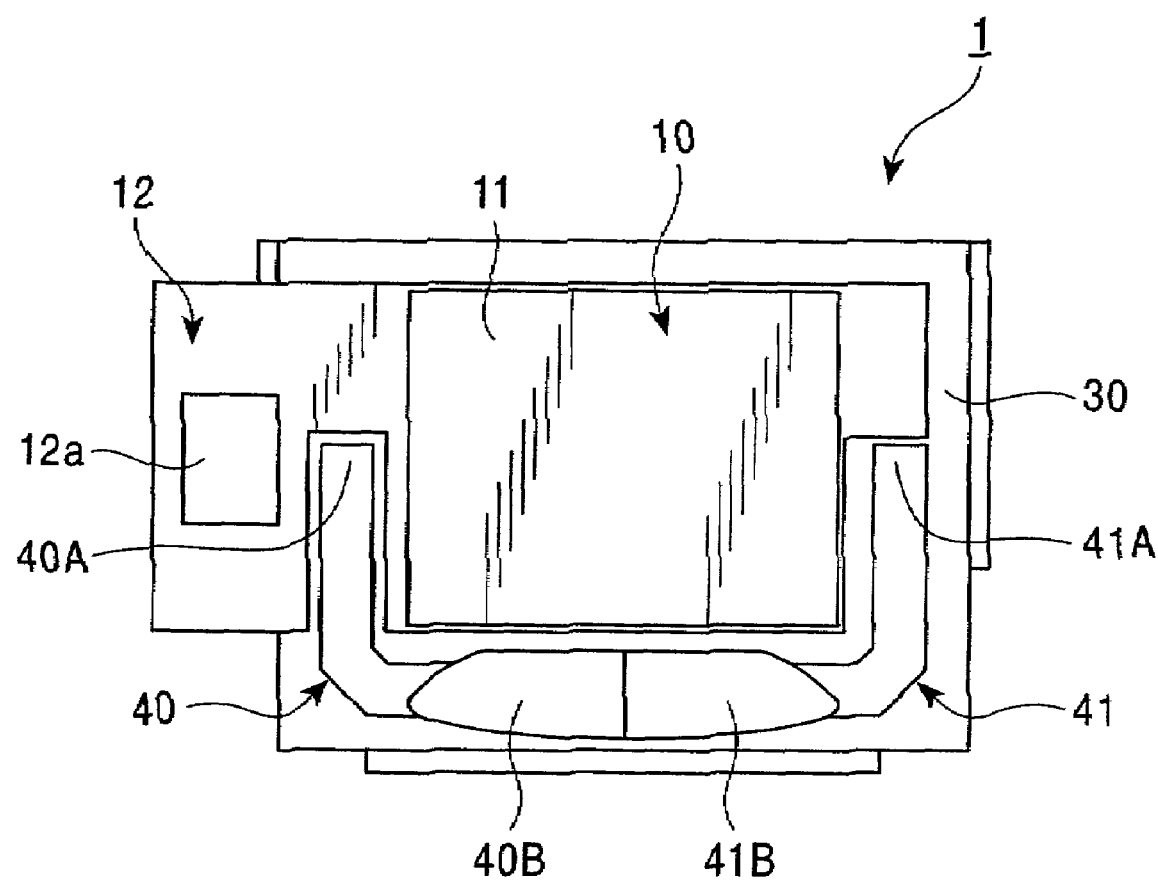
FIG. 1 is a plan view of a coordinate input device according to an embodiment of the present invention.
Figure 2:
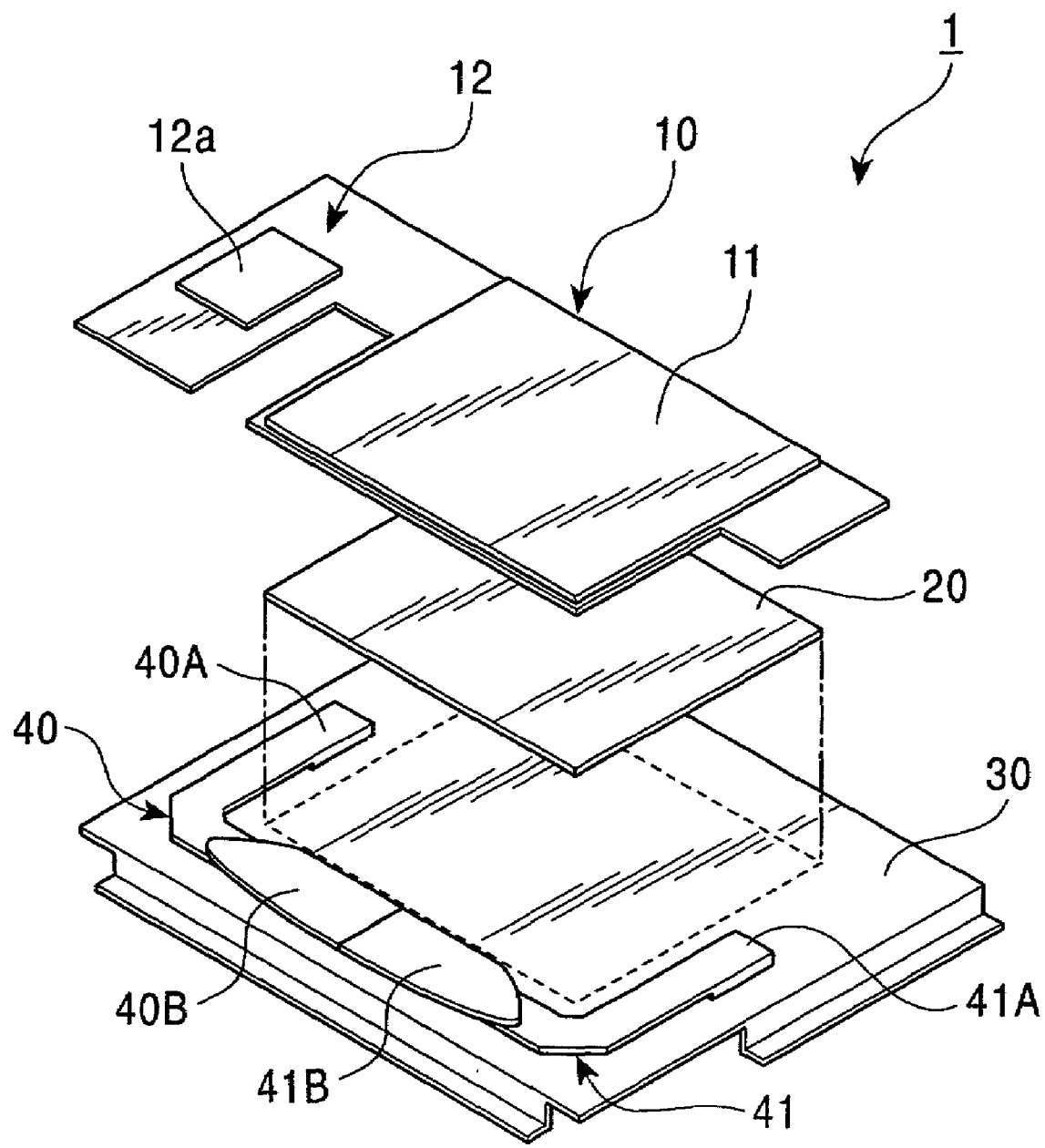
FIG. 2 is an exploded perspective view of the coordinate input device shown in FIG. 1.

FIG. 1 is a plan view showing an example of a coordinate input device according to an embodiment of the present invention and FIG. 2 is an exploded perspective view of the coordinate input device 1 shown in FIG. 1. The coordinate input device 1 shown in FIGS. 1 and 2 includes a coordinate input element 10, a liquid crystal display device (display device) 20 placed on the back side of the coordinate input element 10, a casing 30 for holding the coordinate input element 10 and the liquid crystal display device 20, and two push button switches 40 and 41 provided on the casing 30.

The liquid crystal display device 20 is placed at the center on the upper side of the casing 30 so as to be sandwiched by the coordinate input element 10 and the casing 30. The display area of the liquid crystal display device 20 faces the back side of a coordinate detector 11 of the coordinate input element 10. The push button switches 40 and 41 are formed in an L-shape and a reverse L-shape, respectively, in plan view, first ends of the push button switches 40 and 41 are fixing portions 40A and 41A, and the other ends are operation buttons 40B and 41B operated by a user. The L-shaped push button switch 40 and the reverse L-shaped push button switch 41 are placed symmetrically, with the center being the opposing portions of the ends of the operation buttons 40B and 41B. These push button switches 40 and 41 are placed so as to surround part of the liquid crystal display device 20. The fixing portions 40A and 41A are fixed to the casing 30 at the center of both sides of the liquid crystal display device 20.

Next, the coordinate input element 10 will be described with reference to FIGS. 3 to 5.

Figure 3:
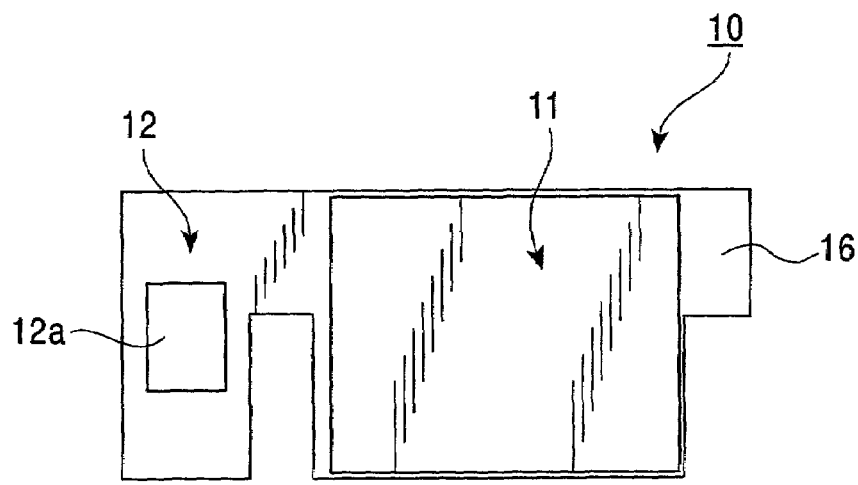
FIG. 3 is a plan view of a coordinate input element according to the embodiment of the present invention.
Figure 4:
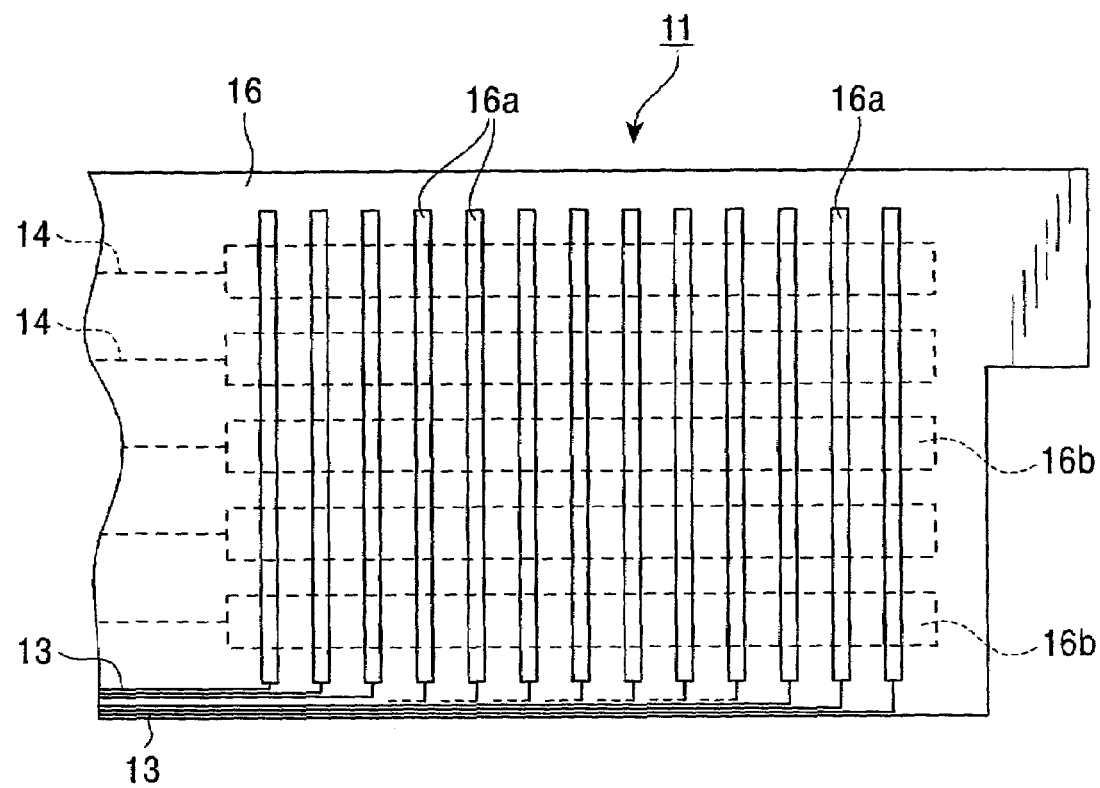
FIG. 4 is a plan view of a coordinate detector of the coordinate input element shown in FIG. 3.
Figure 5:
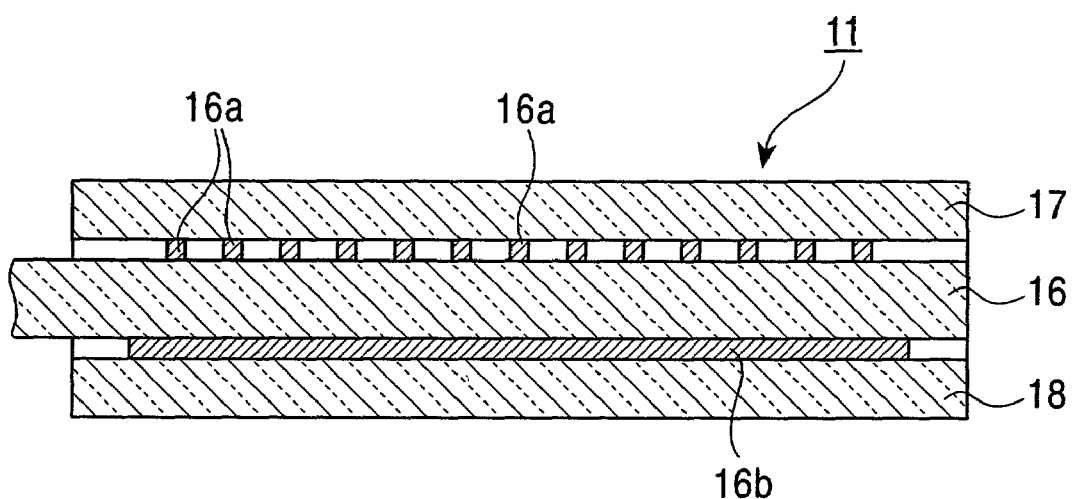
FIG. 5 is a longitudinal sectional view of the coordinate detector of the coordinate input element shown in FIG. 3.

FIG. 3 is a plan view of the coordinate input element 10 shown in FIGS. 1 and 2, FIG. 4 is a perspective plan view of the coordinate detector 11 of the coordinate input element 10, and FIG. 5 is a cross-sectional view of the coordinate detector 11 shown in FIG. 4.

As shown in FIG. 3, the coordinate input element 10 includes the coordinate detector 11 for detecting information scanned by a finger of the user, a pen, or the like and a controller 12 provided on one side (left side in the figure) of the coordinate detector 11. In the coordinate input element 10 of the embodiment, the coordinate detector 11 and the controller 12 are integrated so as to share a substrate (a second insulating layer) 16. As shown in FIG. 3, the controller 12 has a control circuit 12a for driving and controlling the coordinate detector 11 on the substrate 16 shared by the coordinate detector 11. The control circuit 12a is electrically connected to the coordinate detector 11 through transparent circuit wiring lines (not shown) formed on the substrate 16.

As shown in FIGS. 4 and 5, in the coordinate detector 11, a plurality of (thirteen in FIG. 4) linear transparent electrodes (a first electrode layer) 16a extending in the direction orthogonal to the longitudinal direction of the substrate 16 are provided in parallel on the upper surface of the flat substrate (second insulating layer) 16, which comprises a transparent resin film and glass. Also, on the lower surface of the substrate 16, a plurality of (five in FIG. 4) strip-like transparent electrodes (a second electrode layer) 16b extending in the direction orthogonal to the transparent electrodes 16a provided on the upper surface of the substrate 16 are formed in parallel.

Also, as shown in FIG. 5, a protective layer (a first insulating layer) 17 comprising a transparent resin substrate is bonded to the substrate 16 with a transparent adhesive so as to cover the transparent electrodes 16a and a lower insulating layer (a third insulating layer) 18 comprising a transparent resin material is bonded to the substrate 16 with a transparent adhesive so as to cover the transparent electrodes 16b on the lower side of the substrate 16. A transparent hard coat layer having surface unevenness may be bonded to the upper surface of the protective layer 17 with a transparent adhesive or the like. When such a layer is provided, the friction between the tip of a finger or a pen and the scanned surface is reduced when the surface of the coordinate detector 11 is scanned by the finger or the pen, and thus the usability can be improved.

One end in the longitudinal direction (the lower end in FIG. 4) of each of the transparent electrodes 16a is connected to one end of corresponding circuit wiring line 13 comprising a transparent conductive material. The other end of each circuit wiring line 13 is connected to the control circuit 12a shown in FIG. 3 so that the control circuit 12a and the transparent electrodes 16a are electrically connected. On the other hand, one end in the longitudinal direction (the left end in FIG. 4) of each of the transparent electrodes 16b formed on the lower surface of the substrate 16 is connected to one end of corresponding circuit wiring line 14 comprising a transparent conductive material. The other end of each circuit wiring line 14 is connected to the control circuit 12a so that the control circuit 12a and the transparent electrodes 16b are electrically connected.

In the embodiment, each of the substrate 16 (second insulating layer), the protective layer 17 (first insulating layer), and the lower insulating layer 18 (third insulating layer) comprises a transparent resin substrate. However, these layers can be formed by applying a liquid resin material and then curing. For example, in order to form the protective layer 17 with this method, a light setting resin or a thermosetting resin is applied to cover the transparent electrodes 16a so that the resin is cured by ultraviolet radiation or heating. Also, only the lower insulating layer 18 may be a transparent resin substrate and the other layers may be formed by applying a resin and curing it as described above.

By forming each of the layers by application of a resin and curing, an extremely thin layer can be easily formed. Accordingly, the light transmittance of the coordinate detector 11 can be easily increased compared to the case where the resin substrate is bonded with an adhesive.

The display area of the liquid crystal display device 20 is placed on the back side of the coordinate detector 11 and the liquid crystal display device 20 is sandwiched by the coordinate input element 10 and the casing 30. In the coordinate input device 1 of the embodiment, the size of the liquid crystal display device 20 is substantially the same as that of the coordinate detector 11. Also, information displayed on the liquid crystal display device 20 is transmitted through the coordinate detector 11 so that the user can see the information. Also, a conductive ground layer is provided on a plane surface of the liquid crystal display device 20 so as to keep the coordinate detector 11 and the liquid crystal display device 20 electrically stable and to prevent an electrical disturbance from the electronic equipment.

The liquid crystal display device 20 may be any of a reflective-type, a transmissive-type, and a transflective-type. In particular, the advantage of the coordinate input device of the present invention becomes significant when a reflective or transflective liquid crystal display device is used. The reason is as follows. In a reflective or transflective liquid crystal display device, display is performed by reflecting an external light at the reflective layer inside the device and thus the luminance greatly depends on the amount of external light. The coordinate input element 10 of the present invention has a high light transmittance, and thus attenuation of the light entering the liquid crystal display device and the light radiated from the device can be suppressed when the light is transmitted through the coordinate detector 11. Accordingly, a bright display can be realized. Also, when a transmissive liquid crystal display device is used, the light radiated from the liquid crystal display device 20 is transmitted through the coordinate detector 11 with little attenuation so as to reach the user, and thus a clear and bright display can be obtained.

The operation buttons 40B and 41B of the push button switches 40 and 41 are movable vertically and are urged upward by tact switches (not shown) provided on the back side of these buttons. When one of the operation buttons 40B and 41B is pushed downward by the user, the tact switch on the back side is turned on and the tact switch is turned off when the user releases the button. Although two push button switches are used in the embodiment, the number of push button switches may of course be one or more than two. The number of push button switches may be selected according to the required functionability.

The coordinate input device 1 according to the embodiment having the above-described configuration can be used as, for example, a pointing device of a notebook personal computer. In this case, by scanning the upper surface of the coordinate detector 11 with a finger or a pen, a part of the electric flux lines formed between the transparent electrodes 16a and 16b shown in FIG. 4 is absorbed by the finger or the pen at the positions where the transparent electrodes 16a and 16b cross, and the current applied to the transparent electrodes 16b varies and thus the electrostatic capacitance varies. The variation in the electrostatic capacitance is converted to a variation in an electrical signal by the control circuit 12a provided in the controller 12, and the variation in the electrical signal is externally output as coordinate position information. Then, the cursor displayed on the display of the personal computer moves based on the coordinate position information.

In the coordinate input device 1 of the present invention, since all the members of the coordinate detector 11 of the coordinate input element 10 are formed by transparent material, the user can see the display on the liquid crystal display device 20 through the coordinate detector 11. Consequently, by displaying the operating method, hints for operation, and so forth of the coordinate input element 10 on the liquid crystal display device 20, a user unaccustomed to operate the device can easily operate the coordinate input element 10. The liquid crystal display device 20 can display arbitrary information. Accordingly, by changing information to be displayed as required, the usability of electronic equipment including the coordinate input device 1 can be significantly improved.

The control circuit 12a provided in the coordinate input element 10 of the embodiment scans the transparent electrodes 16a and 16b of the coordinate detector 11 while the coordinate input element 10 is not being operated (when a finger or a pen is not in contact with or is not approaching the coordinate detector 11) and stores an electrical signal obtained by the scan as a reference signal. Also, the control circuit 12a subtracts the reference signal from the detection signal obtained by scanning the transparent electrodes 16a and 16b so as to correct the detection signal during an operation of the coordinate input element 10 (when the surface of the coordinate detector 11 is scanned by a finger or a pen).

That is, by comparing the electrostatic capacitance of the coordinate detector 11 while no operation is performed and the electrostatic capacitance of the coordinate detector 11 while an operation is performed, the change in the electrostatic capacitance caused by a finger or a pen during an operation can be extracted as a detection signal. Also, even when the electrostatic capacitance is gradually disturbed by external influences, the change in the electrostatic capacitance caused by the disturbance can be canceled by performing the above-described correction. Accordingly, a malfunction is less likely to occur in the coordinate input device.

Further, with the above-described correction method, a noise disturbing the coordinate detector 11 from a circuit of electronic equipment including the coordinate input device 1 and the drive circuit of the display device can be canceled in the same way. Therefore, the coordinate input device 1 operates extremely stably.

Also, since a ground layer comprising metal is not provided at the bottom of the coordinate detector 11, extremely high light transmittance can be realized. On the other hand, the electrostatic capacitance generated between the transparent electrodes 16a and 16b is likely to be unsteady due to the variation in the electrostatic capacitance itself and noise caused by driving the control circuit. However, the variation in the electrostatic capacitance can be canceled by the function of the above-described control circuit 12a.

In addition, in the coordinate input device 1 of the embodiment, the coordinate input element 10 is preferably operated in a mode wherein the frequency for scanning the transparent electrodes 16a is different from the frequency for driving the liquid crystal display device 20. With this configuration, a malfunction of the coordinate input element 10 and distortion of the display of the liquid crystal display device 20 can be prevented, and thus the coordinate input device 1 of the present invention can operate stably.

Figure 6:
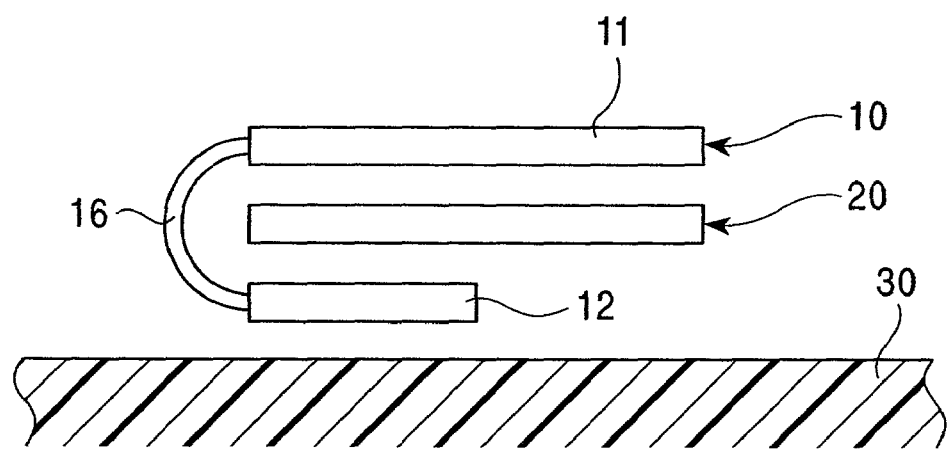
FIG. 6 is a side view of a coordinate input device according to another embodiment of the present invention.
Figure 7:
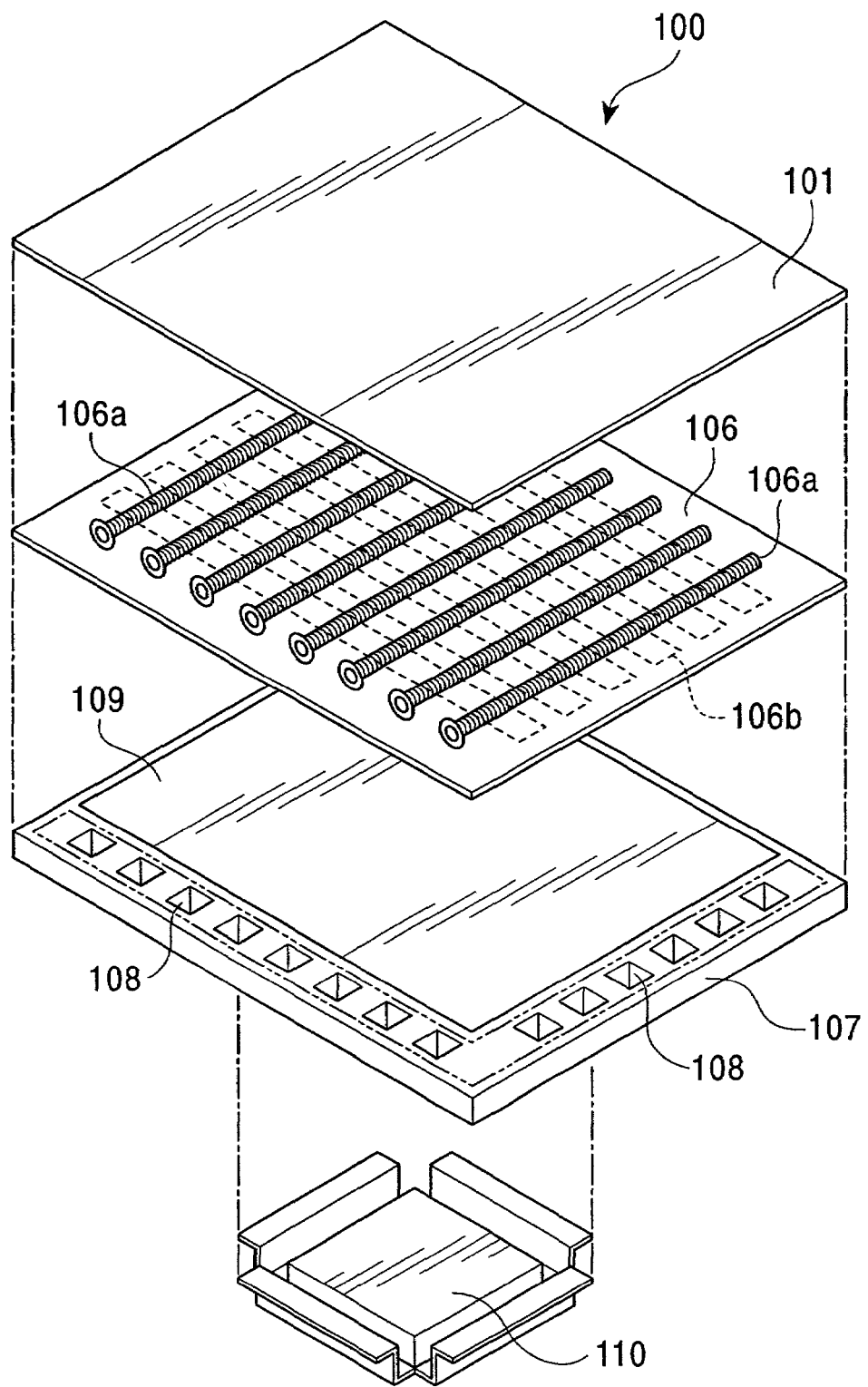
FIG. 7 is an exploded perspective view of a known coordinate input device.

In the above-described embodiment, the controller 12 is placed on a side of the coordinate detector 11. However, the controller 12 can be placed on the back side of the liquid crystal display device 20, as shown in FIG. 6, if the substrate 16 is a flexible substrate. With this configuration, the casing 30 can be miniaturized in both cases where the liquid crystal display device 20 is a reflective-type and a transmissive-type, and thus the space for the coordinate input device 1 can be reduced in proportion to the reduction in size of the coordinate input element 10 shown in FIG. 1. Therefore, the space required in electronic equipment can be effectively used.

The substrate 16 on which the coordinate detector 11 and the controller 12 are formed is a flexible substrate in the above-described embodiment. However, in order to achieve the above configuration, at least the wiring portion for connecting the coordinate detector 11 and the controller 12 may be a flexible substrate. That is, the coordinate detector 11 and the controller 12 are formed on separate substrates and are connected by a flexible wiring board (flexible printed board) so that the coordinate detector 11 and the controller 12 may be electrically connected by the circuit wiring lines formed on the wiring board.

What is claimed is:

1. A coordinate input device comprising:
    a coordinate detector including:
        a first insulating layer which is transparent;
        a second insulating layer which is transparent and which is formed on a lower surface of the first insulating layer;
        a first electrode layer having a plurality of transparent electrodes formed in parallel and between the lower surface of the first insulating layer and an upper surface of the second insulating layer;
        a second electrode layer having a plurality of transparent electrodes which are aligned in parallel and which extend in a direction orthogonal to the transparent electrodes of the first electrode layer, the second electrode layer being formed on a lower surface of the second insulating layer; and
        a third insulating layer which is transparent and which is formed on a lower surface of the second electrode layer, and
    a controller which is electrically connected to the two electrode layers of the coordinate detector so as to drive and control the electrode layers and which has a correction circuit to remove electrostatic capacitance noise that disturbs the coordinate detector, the controller including a reference signal storing circuit to store a reference signal, which is a detection signal obtained by scanning the electrodes of the first electrode layer and the second electrode layer while no operation is performed and a correction value calculating circuit to subtract the reference signal from a detection signal while an operation is performed, thereby correcting the detection signal during the operation.

2. The coordinate input device according to claim 1 further comprising:
    a display device placed on a back side of the coordinate detector,
    wherein a scanning frequency for scanning the electrodes of the coordinate input device is different from a driving frequency of the display device.

3. The coordinate input device according to claim 2, wherein a ground layer comprising a conductor is provided on a back side of the display device.

4. The coordinate input device according to claim 2, wherein the coordinate detector and the controller of the coordinate input device are connected by a flexible wiring board, and the flexible wiring board is placed on a side of the display device such that the controller is placed on a back side of the display device.

5. The coordinate input device according to claim 2, wherein the coordinate detector and the display device are held on a casing and at least one push button switch is provided on an upper surface of the casing.

6. The coordinate input device according to claim 2, further comprising a casing on which the coordinate detector and the display device are held and a plurality of push button switches provided on an upper surface of the casing.

7. The coordinate input device according to claim 6, wherein the push button switches are formed in an L-shape and a reverse L-shape to surround a portion of the display device.

8. The coordinate input device according to claim 6, wherein the push button switches are symmetrically formed around the portion of the display device.

9. The coordinate input device according to claim 6, wherein the push button switches comprise adjacent operation buttons.

10. The coordinate input device according to claim 6, wherein the push button switches comprise fixing portions fixed to the casing at a center of opposing sides of the display device.

11. The coordinate input device according to claim 10, wherein the second insulating layer has cutouts formed to accept the fixing portions.

12. The coordinate input device according to claim 2, wherein the display device is one of a liquid crystal display device and an EL display device in which electroluminescent elements are aligned.

13. The coordinate input device according to claim 1, wherein each of the first insulating layer, the second insulating layer, and the third insulating layer comprises a flexible resin substrate.

14. The coordinate input device according to claim 1, wherein the light transmittance of the coordinate detector is at least 90%.

15. The coordinate input device according to claim 1, wherein at least one of the first insulating layer, the second insulating layer, and the third insulating layer comprises a UV-cured or thermoset resin substrate.

16. The coordinate input device according to claim 1, wherein the first electrode layer is formed on the upper surface of the second insulating layer.

17. A coordinate input device comprising:
a coordinate detector including:
a first insulating layer which is transparent;
a second insulating layer which is transparent and which is formed on a lower surface of the first insulating layer;
a first electrode layer having a plurality of transparent electrodes formed in parallel and between the lower surface of the first insulating layer and an upper surface of the second insulating layer;
a second electrode layer having a plurality of transparent electrodes which are aligned in parallel and which extend in a direction orthogonal to the transparent electrodes of the first electrode layer, the second electrode layer being formed on a lower surface of the second insulating layer; and
a third insulating layer which is transparent and which is formed on a lower surface of the second electrode layer,
a display device placed on a back side of the coordinate detector, and
a flexible wiring board that connects the coordinate detector and a controller of the coordinate input device, the flexible wiring board placed on a side of the display device such that the controller is placed on a back side of the display device,
wherein the controller is electrically connected to the two electrode layers of the coordinate detector so as to drive and control the electrode layers and which has a correction circuit to remove electrostatic capacitance noise that disturbs the coordinate detector, the controller including a reference signal storing circuit to store a reference signal, which is a detection signal obtained by scanning the electrodes of the first electrode layer and the second electrode layer while no operation is performed and a correction valued calculating circuit to subtract the reference signal from a detection signal while an operation is performed, thereby correcting the detection signal during the operation,
wherein a scanning frequency for scanning the electrodes of the coordinate input device is different from a driving frequency of the display device.

18. The coordinate input device according to claim 17, wherein a ground layer comprising a conductor is provided on a back side of the display device.

19. The coordinate input device according to claim 17, wherein each of the first insulating layer, the second insulating layer, and the third insulating layer comprises a flexible resin substrate.

20. The coordinate input device according to claim 17, further comprising a casing on which the coordinate detector and the display device are held and a plurality of push button switches provided on an upper surface of the casing.

21. The coordinate input device according to claim 20, wherein the push button switches are formed in an L-shape and a reverse L-shape to surround a portion of the display device.

22. The coordinate input device according to claim 20, wherein the push button switches are symmetrically formed around the portion of the display device.

23. The coordinate input device according to claim 20, wherein the push button switches comprise adjacent operation buttons.

24. The coordinate input device according to claim 20, wherein the push button switches comprise fixing portions fixed to the casing at a center of opposing sides of the display device.

25. The coordinate input device according to claim 24, wherein the second insulating layer has cutouts formed to accept the fixing portions.

26. The coordinate input device according to claim 17, wherein at least one of the first insulating layer, the second insulating layer, and the third insulating layer comprises a UV-cured or thermoset resin substrate.

27. The coordinate input device according to claim 17, wherein the first electrode layer is formed on the upper surface of the second insulating layer.

* * * * *